Patented Apr. 7, 1953

2,634,195

UNITED STATES PATENT OFFICE 2,634,195

METHOD FOR MAKING GLASS ENAMELS SULFIDE RESISTANT

Robert W. Pelz, Parma, Ohio, assignor to Ferro Corporation, a corporation of Ohio No Drawing. Application May 21, 1949, Serial No. 94,727

5 Claims. (Cl. 41—42)

This invention relates as indicated to a new and novel method for rendering glass enamels resistant to sulfide attack.

Heretofore, lead bearing glass enamels for decorating glass articles, such as tumblers, bottles, lampshades, etc., have had the undesirable property of turning brown upon standing. It has been found that the hydrogen sulfide present in the atmosphere, particularly in industrial areas, reacts with any free lead in the glass enamels to form a coating of lead sulfide. My present invention relates to a process for treating such enamels after application to prevent sulfide discoloration.

It is therefore a principal object of my invention to provide a method for preventing glass articles decorated with lead bearing enamels from becoming discolored.

A further object of this invention is to provide an economical method of preventing sulfide discoloration which is applicable to any lead bearing glass enamel.

To the accomplishment of the foregoing ends, said invention, then, comprises the features hereinafter fully described and particularly pointed out in the claims, setting forth in detail certain illustrative embodiments of the invention, these being indicative, however, of but a few of the various ways in which the principle of the invention may be employed.

Broadly stated, this invention provides a method for rendering glass articles, decorated with lead bearing enamels, sulfide resistant which comprises subjecting said decorated article to a bath of dilute acid and then thoroughly rinsing said decorated article in water.

The need for a sulfide resistant lead bearing glass enamel has long been recognized by those skilled in the art of decorating glass articles. The typical lead bearing glass enamel is ground because of necessity to an extremely fine powder before it is applied to a glass surface and fired. It is believed that this grinding process grinds the enamel so fine as to cause the presence of some free lead ions. The ground enamel when applied to a glass article is fired and during this firing process the free lead ions come to the surface of the decorated article. It is these free lead ions that then react with the hydrogen sulfide at the atmosphere to form brown lead sulfide on the surface of the decorated article. I have found that by subjecting the fired decorated glass article to a bath of a dilute acid, such as, acetic, nitric, or hydrochloric the free lead ions are dissolved and then with a thorough water rinsing are washed away thus leaving the surface free of lead and thus preventing the formation of lead sulfide.

Although the foregoing theory is assumed to be correct I do not want to be bound by it. The fact remains that when the process of the present invention is used the treated articles are sulfide resistant and do not become sulfide stained upon exposure to hydrogen sulfide.

I have tried various salts such as ammonium nitrate, ammonium acetate and calcium acetate in place of the aforementioned acids. Although they reduced sulfide attack considerably they do not give as complete resistance as the acids.

In the preferred embodiment of my invention I use from a ¼% to 5% solution of acetate acid or hydrochloric acid, immerse the decorated article in the acid bath for about 1–5 minutes and then rinse the acid treated article in water containing soap or some other detergent. Or, in general a pH of from about 1.0 to about 4.0 has been found to be the desired range for carrying out the process of my invention. The length of time the decorated article is left in the acid bath is inversely proportional to the concentration of the acid or in terms of pH the length of time the decorated article is left in the acid bath is directly proportional to the pH. That is, the stronger the acid solution the shorter the time the decorated article is left in the acid bath. It is imperative that adequate rinsing is done so that all of the dissolved lead is removed from the surface.

This process is applicable to any lead bearing glass enamel of which the following are given as examples of such enamels.

| A | B |
|---|---|
| 72.5 lbs. PbO | 67.5 lbs. PbO |
| 5.0 lbs. $P_2O_3$ | 5.0 lbs. $B_2O_3$ |
| 22.5 lbs. $SiO_2$ | 27.5 lbs. $SiO_2$ |
| 0.5 lb. $Al_2O_3$ | 0.5 lb. $Al_2O_3$ |
| 0.55 lb. $TiO_2$ | 1.0 lb. $TiO_2$ |
| 1.0 lb. $Li_2O$ | 1.0 lb. $Li_2O$ |

So that the effectiveness of the sulfide resistance could be determined the following test was devised and used:

$H_2S$ was bubbled through distilled water at room temperature (70°–75° F.) for 10 minutes. The bubbling of the $H_2S$ was then adjusted so that approximately 100 bubbles rose per minute. Panels with the glass enamel were placed in this solution at such an angle as to allow the $H_2S$ to rise in contact with the glass enamel. The panels were immersed in the $H_2S$ bath for 5 minutes, after which they were removed and allowed to air dry. No wiping of samples was done.

As illustrative of the several ways in which the process of my invention may be carried out, reference may be had to the following examples:

Example I

4" x 4" glass panels were sprayed with a glass enamel (similar to the aforementioned glass enamel examples) to 2.2 grams or 20 grams 1 sq. ft. dried, and fired at 1100° F. Hunter reflectometer readings were then taken on the fired panels. The panels were then divided into groups and treated in the following manner:

A—No treatment—standard.
B—Dipped in 4% acetic bath for 1 minute and rinsed in water spray.
C—Dipped in 4% acetic bath for 1 minute, washed in water containing detergent and rinsed in a water spray.

All samples were then subjected to the previously discusssed $H_2S$ test.

Reflectometer readings were then again taken on the treated samples. The following reflectometer readings were noted.

| | Blue | | | Green | | | Amber | | |
|---|---|---|---|---|---|---|---|---|---|
| | Before Treatment | After Treatment | Difference | Before Treatment | After Treatment | Difference | Before Treatment | After Treatment | Difference |
| A | 60.4 | 0.0 | 0.0 | 58.2 | 0.0 | 0.0 | 56.4 | 0.0 | 0.0 |
| B | 60.2 | 66.4 | +6.2 | 57.2 | 61.7 | +4.5 | 55.7 | 60.9 | +4.7 |
| C | 61.2 | 67.5 | +6.3 | 58.2 | 63.0 | +4.8 | 56.7 | 61.2 | +4.5 |

The results of the aforegoing test were as follows:

(1) The untreated sample showed severe sulfide staining whereas the treated samples remained white and unstained.

(2) The treated samples showed increased reflectance which is an extremely valuable feature whereas the untreated sample showed no beneficial increase in reflectance.

(3) It is to be noted there is no reflectometer reading for the standard sample after treatment. This is because the sample was so badly sulfide stained a reading could not be taken.

Example II

4" x 4" were prepared as in Example I and reflectometer readings taken. The panels were then divided into groups and treated in the following manner:

A—No treatment—standard.
B—Dipped in ¼% HCl bath for 1 minute and rinsed in water spray.
C—Dipped in ¼% HCl bath for 1 minute, washed in water containing detergent, and rinsed in a water spray.

All samples were then subjected to previously mentioned $H_2S$ test.

Reflectometer readings were then again taken on the treated samples. The following reflectometer readings were noted.

| | Blue | | | Green | | | Amber | | |
|---|---|---|---|---|---|---|---|---|---|
| | Before Treatment | After Treatment | Difference | Before Treatment | After Treatment | Difference | Before Treatment | After Treatment | Difference |
| A | 60.5 | 0.0 | 0.0 | 58.4 | 0.0 | 0.0 | 56.6 | 0.0 | 0.0 |
| B | 60.4 | 66.2 | +5.8 | 58.0 | 61.4 | +4.2 | 55.5 | 59.9 | +4.4 |
| C | 61.0 | 66.3 | +5.9 | 58.2 | 62.7 | +4.5 | 56.6 | 60.6 | +4.2 |

The results of the aforegoing test were as follows:

(1) The untreated sample showed severe sulfide staining whereas the treated samples remained white and unstained.

(2) The treated samples showed increased reflectance.

(3) It is to be noted again there is no reflectometer reading for the standard sample after exposure to $H_2S$. This is because the sample was so badly sulfide stained a reading could not be taken.

It is to be noted that care in the preparation of the HCl solution must be exercised. I have found that when a decorated article is inadvertently left in the HCl bath too long or if the acid concentration is too strong the HCl will etch the surface of the glass enamel. For this reason I prefer the use of the acetic acid bath since the acetic acid is a weaker acid than the HCl and the concentrations more easily controlled.

From the foregoing discussion and examples it can readily be seen that by using my process a glass article decorated with a lead bearing glass enamel can withstand the most severe sulfide conditions and also be increased in reflectance.

The use of the expression "lead bearing glass enamel" is not to be confused with the expression "lead bearing glass." Those versed in the art will readily recognize the differences which exist between a glass and an enamel. Also it is readily appreciated (by those versed in the art) that in the manufacture of a glass enamel the enamel forming materials are reduced to molten condition, fritted into water, and very finely ground before applied to a work piece, whereas, in the manufacture of a lead glass the glass forming materials are reduced to a molten condition and in such condition molded into the desired objects without any of the intermediate steps as performed in the glass enamel.

Other modes of applying the principle of the invention may be employed, change being made as regards the details described, provided the features stated in any of the following claims or the equivalent of such be employed.

I therefore particularly point out and distinctly claim as my invention:

1. The method of rendering resistant to sulfide staining the surface of a glass article decorated with a lead bearing colored glass enamel the composition of which, calculated on the basis of the oxides, is more than 50% lead, which comprises subjecting such decorated surface to a bath of a dilute solution of an acid having a pH of from about 1 to about 4 for a period of from about 1 to about 5 minutes, the length of which period is inversely proportional to the pH of the acid solution and not sufficient to decrease the reflectance of said surface and then thoroughly water washing the thus treated surface.

2. The method of rendering resistant to sulfide staining the surface of a glass article decorated with a lead bearing colored glass enamel the composition of which, calculated on the basis of the oxides, is more than 50% lead, which comprises subjecting such decorated surface to a bath comprising from about ¼% to about 5% of an aqueous acid solution for about 1 to about 5 minutes, said time for the acid treatment being inversely proportional to the acid concentration and not sufficient to decrease the reflectance of said surface and then thoroughly water washing the thus treated surface.

3. The process as in claim 2 said acid being acetic acid.

4. The process as in claim 2 said acid being hydrochloric acid.

5. The process as in claim 2 said acid being nitric acid.

ROBERT W. PELZ.

REFERENCES CITED

The following references are of record in the file of this patent:

UNITED STATES PATENTS

| Number | Name | Date |
| --- | --- | --- |
| 1,306,505 | Toyokitsu | June 10, 1919 |
| 1,782,169 | Kamita | Nov. 18, 1930 |
| 2,220,862 | Blodgett | Nov. 5, 1940 |
| 2,315,259 | Hyde | Mar. 30, 1943 |
| 2,337,460 | French | Dec. 21, 1943 |
| 2,348,704 | Adams | May 16, 1944 |